UNITED STATES PATENT OFFICE.

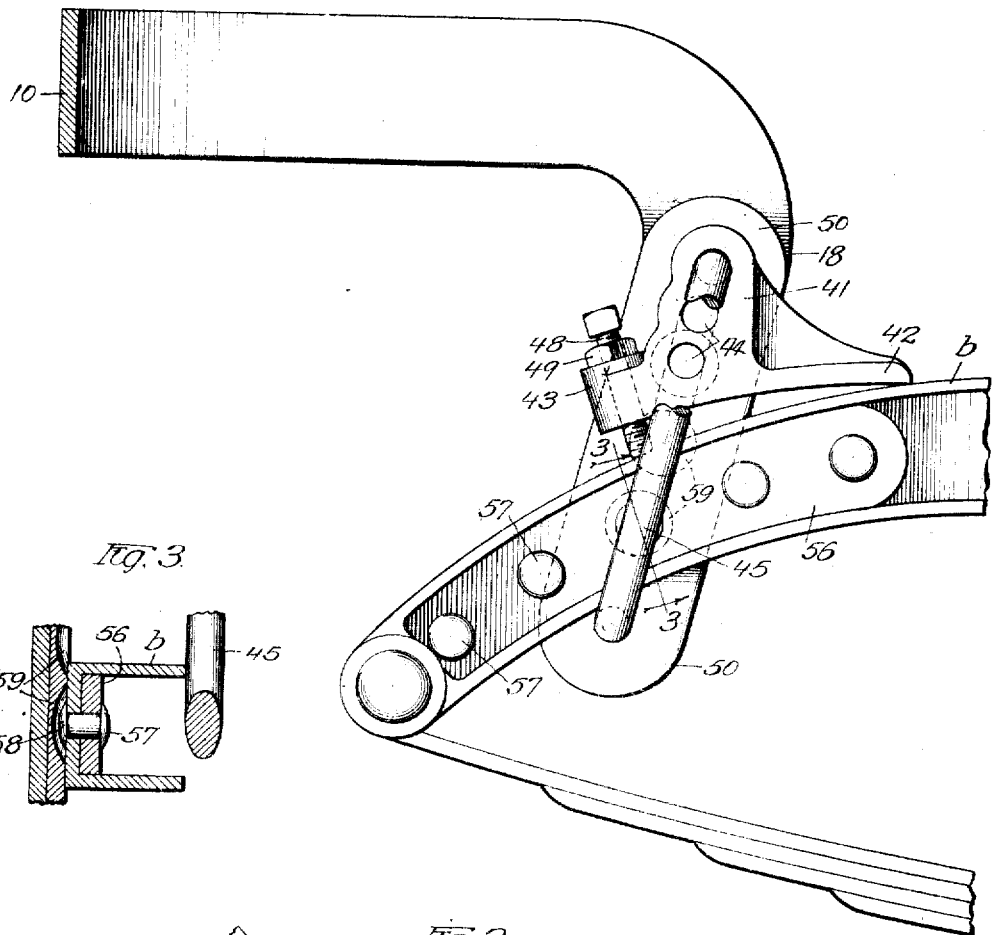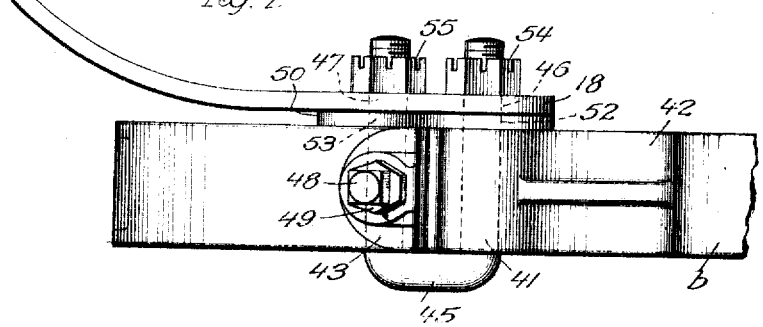

ALLAN L. McGREGOR, OF CHICAGO, ILLINOIS.

AUTOMOBILE-BUMPER.

1,268,590.  Specification of Letters Patent.  Patented June 4, 1918.

Original application filed August 10, 1916, Serial No. 114,089. Divided and this application filed September 8, 1917, Serial No. 190,293. Renewed April 19, 1918. Serial No. 229,663.

*To all whom it may concern:*

Be it known that I, ALLAN L. McGREGOR, a citizen of the United States, and a resident of Chicago, in the county of Cook and State of Illinois, have invented certain new and useful Improvements in Automobile-Bumpers, of which the following is a specification.

This invention relates to automobile bumpers and was originally disclosed and claimed in my application Serial No. 114,089, filed August 10, 1916, this present application being therefore a divisional application.

The object of my invention is to provide improved and more efficient means for securing automobile bumpers to the vehicle side beams.

On the accompanying drawing, on which my invention is illustrated,

Figure 1 is the inner side view of the front end of a vehicle side beam and shows the construction and application of my improved clamping device, Fig. 2 is a plan view of the parts shown in Fig. 1, and Fig. 3 is a sectional view on plane 3—3, Fig. 1.

In the arrangement shown, the bumper has a front section 10 whose ends extend horizontally rearwardly and are then deflected downwardly to provide ends 18 to be engaged by the clamping fittings to secure the ends along the outsides of the vehicle side beams. For each vehicle side beam a fitting 41 is provided having the rearwardly extended base section 42 and a front lug 43. Each fitting has a plurality of holes 44, one above the other, for receiving the upper limb of a U-bolt or strap 45. The ends 18 of the bumper structure have holes 46 at their upper ends for registering with the holes 44 of the fittings, and at their lower ends have holes 47 for receiving the lower limb of the U-bolt. The fittings 41 rest on the upper side of the curved front ends of the vehicle side beams *b*, and extending through the lug 43 of each fitting is a jack screw 48 engaged by a lock nut 49. The ends 18 of the bumper structure extend downwardly along the outsides of the side beams but spaced sufficiently therefrom to leave room for plates 50 which at their upper ends have holes 52 for registering with the holes 44 of the fittings 41 and the holes 46 in the ends 18, and at their lower ends the plates have holes 53 for registering with the holes 47 at the lower part of the ends 18, the upper and lower limbs of the U-bolt passing through the holes 52 and 53 respectively. When the U-bolts are drawn up tightly by means of their nuts 54 and 55 the bumper ends 18 and the plates 50 will be securely clamped to the fittings 41 and the side beams *b* will be securely clamped between the yokes and the plates 50, the lower limb of the U-bolts engaging against the under sides of the side beams and the fittings 41 resting with their rear edges and the lower ends of the jack screws against the upper sides of the side beams.

By means of the jack screws 48 adjustment can be made for seating the fittings 41 at such angle on the curved upper surfaces of the vehicle side beams that the front section 10 of the bumper structure will be in a vertical plane. When the bumper structure is applied to a vehicle the fittings, plates and U-bolts are assembled and before the U-bolt nuts are drawn tight the fittings are slid longitudinally along the side beams and the screws 48 adjusted until the front of the bumper is in the desired position and the lower limbs of the U-bolts engage with the under side of the side beams. The U-bolt nuts are then drawn up tight to clamp the parts in adjusted position. After such tightening of the U-bolts the jack screws 48 can be given an additional tightening turn to increase the vertical clamping engagement with the side beams and then the bumper structure will be rigidly locked to the side beams, particularly against rearward displacement thereon. The U-bolts will of course take care of the different widths of side beams and the screws 48 will permit compensation for ordinary changes in curvature. If the differences in curvature are more than ordinary, different sizes of U-bolts can be used and their upper limbs extended through the corresponding holes 44 in the fittings and the registering holes in the plates 50 and the bumper holes 18. In some vehicles the curved front ends of the side beams are strengthened by plates 56 engaging inside the beams and secured against the inner sides thereof by rivets 57 so that the rivet heads 58 will be on the outer faces of the beams against which the plates 50 engage. To accommodate such rivet heads and to permit the plates 50 to rest against the beams, pockets 59 are provided in the plates for receiving the rivet heads. Such engagement of the plates with the rivet heads will further strengthen the connections of the bumper ends with the side beams. It is evident that the plates 50 could be omitted and the ends 18 applied directly to the side beams with pockets cut therein to accommodate the rivets. Such pockets would, however, weaken the ends 18 and it is therefore preferable to insert the plates 50, these greatly strengthening the ends 18.

I do not desire to be limited to the exact constructions and arrangements shown as modifications are no doubt possible which would still come within the scope of the invention.

I claim as follows:

1. In a bumper structure for vehicles, the combination of a bumper front having rearwardly extending side arms whose inner ends are deflected downwardly, said downwardly deflected ends having upper and lower holes therethrough, fittings for engaging the tops of the vehicle side beams and said fittings having transverse holes registering with the holes in the bumper structure ends, clamp structures for engaging through said fitting holes and through the upper and lower holes in said ends and for receiving the vehicle side beams, and jack screws on said fittings for adjusting the distances between the front ends of the fittings and the vehicle side beams.

2. In a bumper structure, the combination of a bumper body having rearwardly extending arms whose inner ends are deflected downwardly and provided with upper and lower holes, fittings for engaging the tops of the front ends of vehicle side beams, said fittings having transverse holes for registering with the holes in said ends, U bolts receiving said side beams and extending through the lower holes of said ends and through the fitting holes and the upper holes of said ends to clamp said ends and the fittings to said side beams, and jack screws on said fittings for tilting said fittings on said beams whereby to vertically adjust the front of the bumper body.

3. The combination with the downwardly curved front ends of vehicle side beams, of a bumper structure comprising a bumper body and rearwardly extending arms whose inner ends are deflected downwardly and provided with upper and lower holes, fittings for engaging the top curved surfaces of the side beams and said fittings having holes for registering with the upper holes of said ends, U-bolts extending through the lower holes of said ends and through the upper holes thereof and the holes of said fittings and receiving the side beams to secure said ends and fittings thereto, and jack screws on said fittings for engaging with the rounded top surfaces of said beams for adjusting the seating of said fittings on said beams to thereby adjust and position the bumper body with reference to the curved side beam ends.

4. The combination with the front vertically curved ends of vehicle side beams, of a bumper structure comprising a front part and rearwardly extending arms having their inner ends extended downwardly and said ends being provided with upper and lower bolt holes, said ends extending alongside of the curved ends of the beams, plates interposed between said ends and said beams, fittings resting on the curved tops of said side beams, said fittings and plates having bolts holes for registering with the upper bolt holes of said ends and said plates having bolt holes for registering with the lower bolt holes in said ends, U-bolts receiving said side beam ends and extending through the lower holes in said ends and plates and through the upper holes of said ends and plates and the registering holes in said fittings to clamp said ends, plates and fittings to said side beams, and jack screws on said fittings for engaging the tops of said side beams to adjust the seating angle of said fittings with said beams and thereby adjust the position of the front part of the bumper structure.

5. The combination with the front ends of vehicle side beams, and strengthening plates riveted thereto, of a bumper structure comprising a front part and downwardly extending arms whose inner ends are deflected downwardly, said ends being provided with upper and lower bolt holes, said ends extending alongside of said beams, plates interposed between said ends and beams and having lower bolt holes for registering with the lower bolt holes in said ends, fittings engaging the upper sides of said beams, said fittings having bolt holes and said plates having upper bolt holes for registering with said fitting holes and the upper holes in said ends, U-bolts receiving said side beams and extending through the lower bolt holes of the ends and plates and through the upper and lower bolt holes of said ends and plates and through the holes of said fittings to clamp the ends, plates and fittings to the beams, jack screws on said fittings for adjusting the seating angle of said fittings with said beams to thereby effect vertical adjustment of the front of said bumper structure, said plates having pockets in their inner faces for receiving the heads of the rivets which secure the strengthening plates to said side beams.

In witness whereof I hereunto subscribe my name this 6th day of September, A. D. 1917.

ALLAN L. McGREGOR.